ABSTRACT

United States Patent [19]

Steinmann

[11] Patent Number: 5,145,944
[45] Date of Patent: Sep. 8, 1992

[54] POLYETHER-POLYESTER BLOCK COPOLYMERS AND THEIR USE AS DISPERSANTS

[75] Inventor: Bettina Steinmann, Praroman, Switzerland

[73] Assignee: Ciba-Geigy Corporation, Ardsley, N.Y.

[21] Appl. No.: 674,630

[22] Filed: Mar. 25, 1991

[30] Foreign Application Priority Data

Mar. 29, 1990 [CH] Switzerland ............... 1036/90

[51] Int. Cl.$^5$ ............... C08G 63/00; B05D 3/02; C08L 51/00; C08F 20/00
[52] U.S. Cl. ............... 528/366; 427/386; 427/388.4; 523/407; 525/449
[58] Field of Search ............... 528/366, 274, 49; 525/524, 403, 449; 560/89; 524/539, 410, 408, 591; 523/402, 403, 407; 521/64; 430/286; 427/386, 388.9; 252/8.1, 8.9, 174.23, 174.24; 260/78.4, 869

[56] References Cited

U.S. PATENT DOCUMENTS

| | | | |
|---|---|---|---|
| 3,963,803 | 6/1976 | Tanaka et al. | 260/873 |
| 4,315,044 | 2/1982 | Elmore et al. | 427/386 |
| 4,415,682 | 11/1983 | Becker | 523/403 |
| 4,861,512 | 8/1989 | Gosselink | 252/174.23 |
| 4,886,845 | 12/1989 | Becker et al. | 523/403 |

*Primary Examiner*—John Kight, III
*Assistant Examiner*—Richard L. Jones
*Attorney, Agent, or Firm*—JoAnn Villamizar

[57] ABSTRACT

Polyether-polyester block copolymers obtainable by anionic copolymerization of a monoepoxy compound with a cyclic anhydride of an aromatic dicarboxylic acid using an alkali metal salt of a polyalkylene glycol or of a polyalkylene glycol monoalkyl ether as initiator are suitable as dispersants, especially for the preparation of aqueous epoxy resin dispersions and emulsions. Coatings made with these dispersions with the addition of hardeners are distinguished by improved surface-coating properties.

11 Claims, No Drawings

POLYETHER-POLYESTER BLOCK COPOLYMERS AND THEIR USE AS DISPERSANTS

The invention relates to certain polyether-polyester block copolymers, to a process for the preparation thereof, to their use as dispersants, to aqueous dispersions comprising the said block copolymers and epoxy resins and to the crosslinked products obtainable by hardening the dispersions.

Polyether-polyester block copolymers are known. For example, U.S. Pat. No. 4,861,512 describes such block copolymers prepared by polycondensation of an alkylene glycol with a dicarboxylic acid or diester thereof in the presence of a polyethylene glycol that is capped at one end and, optionally, an alkali metal salt of a sulfonated aromatic dicarboxylic acid or a diester thereof. The block copolymers so obtained are used as detergent additives.

Attempts have also been made for a long time to prepare stable aqueous epoxy resin dispersions and emulsions suitable for the production of coatings having good surface-coating properties. As is known, the use of highly inflammable and toxicologically hazardous organic solvents should be avoided whenever possible.

Thus, for example, U.S. Pat. No. 4,415,682 describes the preparation of aqueous epoxy resin dispersions with condensation products of polyalkylene glycols and di-epoxides as emulsifiers. In order to be able to obtain these dispersions, however, it is necessary to use relatively large quantities of organic solvents which are then removed to the greatest extent, for example by distillation under reduced pressure. This method is complicated and time-consuming. In addition, the surface-coating properties of the coatings made therewith are not outstanding.

According to U.S. Pat. No. 4,886,845, the properties of the coatings obtained are improved by using self-emulsifiable epoxy resins. Such epoxy resins are obtained by pre-lengthening commercially available epoxy resins with an aromatic polyol and one of the above-described emulsifiers according to U.S. Pat. No. 4,415,682. This additional step of chemically incorporating the emulsifier into the epoxy resin, starting from liquid resins which are converted by the aromatic polyol and the emulsifier into a modified solid resin, is disadvantageous since the use of commercially available unmodified epoxy resins in the dispersions is therefore not possible.

The self-emulsifiable epoxy resins according to U.S. Pat. No. 4,315,044 suffer from similar disadvantages. These are prepared by reacting a diglycidyl ether of a dihydric phenol and a diglycidyl ether of a polyoxyalkylene glycol with a dihydric phenol.

The present invention relates to polyether-polyester block copolymers obtainable by anionic copolymerization of a monoepoxy compound with a cyclic anhydride of an aromatic dicarboxylic acid, using an alkali metal salt of a polyalkylene glycol or of a polyalkylene glycol monoalkyl ether as initiator.

The block copolymers according to the invention are suitable as dispersants, especially for the preparation of aqueous epoxy resin dispersions and emulsions. The term "dispersant" is used in this Application both for dispersants and for emulsifiers, that is to say in general for an agent that is suitable for the preparation of dispersions or emulsions. Similarly, the term "dispersion" is used in this Application to mean both a dispersion and an emulsion.

Using the block copolymers according to the invention, it is possible to prepare aqueous epoxy resin dispersions from mixtures of a solid or liquid resin, the block polymer and, if expedient, small quantities of an organic solvent, by slowly adding water, for example using a dissolver. Owing to the low quantity of organic solvent which may be present, subsequent distillation can be dispensed with. Nor is chemical incorporation of the dispersant, and hence an additional step in the preparation, necessary. In addition, the aqueous epoxy resin dispersions prepared with the novel dispersants have very good surface-coating properties.

The alkali metal salts of polyalkylene glycols or of polyalkylene glycol monoalkyl ethers which are used as initiators for the anionic polymerisation in the preparation of the block copolymers are preferably potassium salts or, especially, sodium salts. They can be prepared, for example, by reacting a suitable polyalkylene glycol or a polyalkylene glycol monoalkyl ether with a suspension of sodium in toluene or with sodium naphthalene or potassium naphthalene in dioxane or tetrahydrofuran. The reaction may be carried out, for example, below or at room temperature for from 1 to 3 hours, preferably under a protective gas.

Suitable polyalkylene glycols are, for example, compounds having from 2 to 10 carbon atoms in the alkylene radical which may be straight-chain or branched. Examples of such radicals are decamethylene, octamethylene, heptamethylene, hexamethylene, pentamethylene, 2,2-dimethyl-1,3-propylene, butylene, 1,2- and 1,3-propylene and ethylene. Both homopolyethers and copolyethers can be used as polyalkylene glycols. Especially suitable copolyethers are polyethylene glycol-polypropylene glycol block copolymers. Suitable monoalkyl ethers of polyalkylene glycols are, for example, $C_1-C_4$alkyl ethers, such as butyl, propyl, ethyl or, especially, methyl ether. Polyalkylene glycols and their monoalkyl ethers are known and are available commercially.

According to this Application, polyalkylene glycols having from 2 to 5000, especially from 10 to 250, and most preferably from 45 to 250, alkylene glycol units are preferably used. Preferred compounds are those wherein the alkylene group of the polyalkylene glycol is 1,4-butylene, 1,2- or 1,3-propylene or, especially, ethylene.

In the preparation of the block polymers according to the invention, it is possible in principle to use any monoepoxy compound that is anionically polymerisable. Examples of suitable monoepoxides are alkyl glycidyl ethers, cycloalkyl glycidyl ethers and aryl glycidyl ethers, and epoxidised olefins, such as styrene oxide, alkene oxides and cycloalkene oxides. Preferred monoepoxides are glycidyl ethers, especially phenyl, p-tolyl or butyl glycidyl ether, alkene oxides, especially 1-hexene oxide, or cycloalkene oxides, especially cyclohexene oxide.

The cyclic anhydride used in the preparation of the block polymers according to the invention may be any anhydride of an aromatic dicarboxylic acid whose carboxy groups are in the ortho- or peri-position with respect to each other. The dicarboxylic acids may be unsubstituted or may contain one or more substituents on the ring provided that these do not react under the reaction conditions of the anionic polymerisation. Examples of suitable substituents are, especially, alkyl, cycloalkyl or aryl radicals or halogen atoms, such as chlorine or bromine. Examples of suitable dicarboxylic acids are phthalic acid, 1,2-, 2,3- and 1,8-naphthalenedicarboxylic acid, 2,6-dichloronaphthalene-1,8-dicarboxylic acid, 2,3,6,7-tetrachloronaphthalene-1,8-dicarboxylic acid, 2,3- or 3,4-benzophenonedicarboxylic acid or 2,3- or 3,4-biphenyltetracarboxylic acid.

Preferred cyclic anhydrides are 1,8-naphthalenedicarboxylic acid anhydride and, especially, phthalic acid anhydride.

Depending on whether an alkali metal salt of a polyalkylene glycol monoalkyl ether or an alkali metal salt of a polyalkylene glycol is used as the anionic initiator, block copolymers comprising one polyether block and one or two polyester block(s) are produced. The preparation of the block copolymers according to the invention by anionic polymerisation makes it possible to synthesise di- or tri-block polymers selectively depending on the polyalkylene glycol initiator chosen. This is not possible in the case of synthesis by polycondensation as is described, for example, in U.S. Pat. No. 4,861,512 which was mentioned at the beginning.

Preferred block copolymers are those wherein the polyester block has from 2 to 1000, preferably from 3 to 100 and most preferably from 3 to 35, recurring units.

Also preferred are block copolymers having a mean molecular weight (numerical mean, Mn) of the entire polymer of from 1000 to 50 000, preferably from 2000 to 30 000, most preferably from 5000 to 15 000.

Among the preferred block copolymers according to the invention are compounds of formula I

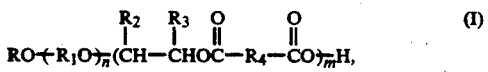

wherein R is $C_1$–$C_4$alkyl or a radical of formula II

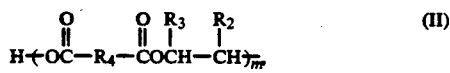

$R_1$ is $C_2$–$C_{10}$alkylene, $R_2$ is hydrogen and $R_3$ is $C_1$–$C_{12}$alkyl, $C_5$–$C_{10}$cycloalkyl, $C_6$–$C_{10}$aryl or a radical —$CH_2OR_5$ in which $R_5$ is $C_4$–$C_{10}$alkyl, $C_5$–$C_6$cycloalkyl or $C_6$–$C_{10}$aryl, or $R_2$ and $R_3$ together with the carbon atoms to which they are bonded are a cyclopentylene or cyclohexylene radical, $R_4$ is phenylene or naphthylene and n is an integer from 2 to 5000 and m is an integer from 2 to 1000.

Examples of suitable radicals R, $R_1$, $R_2$, $R_3$ and $R_4$ can be inferred from the above remarks with regard to the preparation of the block polymers according to the invention.

The invention relates also to a process for the preparation of the polyether-polyester block copolymers according to the invention by anionic copolymerisation of a monoepoxy compound with a cyclic anhydride of an aromatic dicarboxylic acid, using an alkali metal salt of a polyalkylene glycol or of a polyalkylene glycol monoalkyl ether as initiator.

The preparation of the polyalkylene glycol alkali metal salt is described hereinabove. The anionic polymerisation is preferably carried out in an inert aprotic solvent, such as THF, toluene, xylene, isooctane or, especially, in dioxane, by heating the reactants, for example for from 2 to 3 days at from 80° to 100° C. under a protective gas. The reactants are preferably employed in a stoichiometric ratio. When the desired degree of polymerisation has been reached, a few drops of water are added to the solution, and the block copolymer is isolated from the reaction mixture in a suitable manner.

The novel block copolymers are suitable for general use as dispersants for the preparation of oil-in-water or water-in-oil dispersions or emulsions. The invention accordingly relates also to the use of the block copolymers as dispersants.

The block copolymers are most especially suitable for the preparation of aqueous epoxy resin dispersions or emulsions. The invention further relates, therefore, to aqueous dispersions or emulsions comprising (a) a block copolymer according to the invention and (b) an epoxy resin.

The dispersions comprise preferably from 2 to 20% by weight, especially from 2 to 5% by weight, block copolymer (a), from 30 to 78% by weight, especially from 40 to 60% by weight, epoxy resin (b), from 20 to 70% by weight, especially from 40 to 60% by weight, water and, if expedient, from 0 to 25% by weight, especially from 5 to 6% by weight, of an organic solvent, based on the total dispersion. Suitable organic solvents are, for example, 2-ethoxyethanol, 3-methoxypropanol, iso-butanol, toluene or xylene.

The dispersions can be produced, for example, in a dispersing apparatus or in a dissolver by mixing the block copolymer and the epoxy resin and subsequently adding water. When solid epoxy resins are used, they are preferably melted before the mixing operation. If expedient, when the dispersion is being produced, the block copolymer and the epoxy resin can first be mixed with a relatively small quantity of a suitable organic solvent (for example with up to 15% by weight of the resin/dispersant mixture), and the required quantity of water can be added thereafter.

The dispersions according to the invention are highly stable and can therefore be stored for a prolonged period (for example up to 12 months).

In principle, any epoxy resin known in the art may be used in the dispersions according to the invention.

Examples of epoxy resins are:

I) Polyglycidyl and poly(beta-methylglycidyl) esters obtainable by reacting a compound having at least two carboxy groups in the molecule with epichlorohydrin or beta-methyl-epichlorohydrin, respectively. The reaction is advantageously carried out in the presence of bases.

Aliphatic polycarboxylic acids may be used as the compound having at least two carboxy groups in the molecule. Examples of these polycarboxylic acids are oxalic acid, succinic acid, glutaric acid, adipic acid, pimelic acid, suberic acid, azelaic acid or dimerised or trimerised linoleic acid.

It is also possible, however, to use cycloaliphatic polycarboxylic acids, such as, for example, tetrahydrophthalic acid, 4-methyltetrahydrophthalic acid, hexahydrophthalic acid or 4-methylhexahydrophthalic acid.

Furthermore, aromatic polycarboxylic acids may be used, such as, for example, phthalic acid, isophthalic acid or terephthalic acid.

II) Polyglycidyl or poly(beta-methylglycidyl) ethers obtainable by reacting a compound having at least two free alcoholic hydroxy groups and/or phenolic hydroxy groups with epichlorohydrin or beta-methyl-epichlorohydrin, respectively, under alkaline conditions, or in the presence of an acid catalyst and with subsequent alkali treatment.

Ethers of this type are derived, for example, from acyclic alcohols, such as ethylene glycol, diethylene glycol and higher poly(oxyethylene) glycols, propane-1,2-diol or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and from polyepichlorohydrins.

They are, however, also derived, for example, from cycloaliphatic alcohols, such as 1,4-cyclohexanedimethanol, bis(4-hydroxycyclohexyl)methane or 2,2-bis(4-hydroxycyclohexyl)propane, or they have aromatic nuclei, such as N,N-bis(2-hydroxyethyl)aniline or p,p'-bis(2-hydroxyethylamino)diphenylmethane.

The epoxy compounds may also be derived from mononuclear phenols, such as, for example, resorcinol or hydroquinone; or they are based on polynuclear phenols, such as, for example, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, and from novolaks obtainable by condensation of aldehydes, such as formaldehyde, acetaldehyde, chloral or furfuraldehyde, with phenols, such as phenol, or with phenols that are substituted in the nucleus by chlorine atoms or $C_1$-$C_9$alkyl groups, such as, for example, 4-chlorophenol, 2-methylphenol or 4-tert-butylphenol, or by condensation with bisphenols, in the manner described above.

III) Poly(N-glycidyl) compounds obtainable by dehydrochlorination of the reaction products of epichlorohydrin with amines containing at least two amine hydrogen atoms. These amines are, for example, aniline, n-butylamine, bis(4-aminophenyl)methane, m-xylylenediamine or bis(4-methylaminophenyl)methane.

The poly(N-glycidyl) compounds also include, however, triglycidyl isocyanurate, N,N'-diglycidyl derivatives of cycloalkylene ureas, such as ethylene urea or 1,3-propylene urea, and diglycidyl derivatives of hydantoins, such as 5,5-dimethylhydantoin.

IV) Poly(S-glycidyl) compounds, for example di-S-glycidyl derivatives derived from dithiols, such as, for example, ethane-1,2-dithiol or bis(4-mercaptomethylphenyl)ether.

V) Cycloaliphatic epoxy resins, for example bis(2,3-epoxycyclopentyl)ether, 2,3-epoxycyclopentyl glycidyl ether, 1,2-bis(2,3-epoxycyclopentyloxy)ethane or 3,4-epoxycyclohexylmethyl-3',4'-epoxycyclohexane carboxylate.

It is also possible, however, to use epoxy resins in which the 1,2-epoxy groups are bonded to different hetero atoms or functional groups; these compounds include, for example, the N,N,O-triglycidyl derivative of 4-aminophenol, the glycidyl ether glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

There are preferably used epoxy resins that have an epoxy content of from 2 to 10 equivalents/kg and that are glycidyl ethers, glycidyl esters or N-glycidyl derivatives of aromatic, heterocyclic, cycloaliphatic or aliphatic compounds.

Especially preferred epoxy resins are polyglycidyl ethers of bisphenols, such as, for example, of 2,2-bis(4-hydroxyphenyl)propane (bisphenol A) or bis(4-hydroxyphenyl)methane (bisphenol F), of novolaks formed by reacting formaldehyde with a phenol, or of the aliphatic diols mentioned above, especially butane-1,4-diol.

The most preferred epoxy resins are polyglycidyl ethers based on bisphenol A, especially those which have an epoxy content of from 2 to 6 equivalents/kg and which are liquid or have a melting point of less than 100° C.

The most preferred dispersants for the preparation of the aqueous epoxy resin dispersions are the block copolymers according to the invention that are derived from isophthalic acid anhydride and phenyl glycidyl ether, n-butyl glycidyl ether or 1-hexene oxide (butyloxirane), that have one polyether block and one polyester block and that have from 90 to 250 alkylene glycol units in the polyether block and from 5 to 30 recurring units in the polyester block.

As hardeners for the dispersions according to the invention it is possible to use in principle all of the known hardeners for epoxy resins that are stable in water, i.e. do not react with water, and that are miscible with water. Examples of suitable hardeners are aliphatic, cycloaliphatic, aromatic and heterocyclic amines, such as bis(4-aminophenyl)methane, aniline-formaldehyde resin, bis(4-aminophenyl)sulfone, propane-1,3-diamine, hexamethylenediamine, diethylenetriamine, triethylenetetramine, 2,2,4-trimethylhexane-1,6-diamine, m-xylylenediamine, bis(4-aminocyclohexyl)methane, 2,2-bis(4-aminocyclohexyl)propane and 3-aminomethyl-3,5,5-trimethylcyclohexylamine (isophorone diamine), polyaminoamides, such as, for example, those consisting of aliphatic polyamines and dimerised or trimerised fatty acids, polyphenols, such as resorcinol, hydroquinone, 2,2-bis(4-hydroxyphenyl)propane and phenolaldehyde resins, and polycarboxylic acids, such as, for example, phthalic acid, tetrahydrophthalic acid, hexahydrophthalic acid, hexachloroendomethylenetetrahydrophthalic acid, pyromellitic acid, benzophenone-3,3,4',4'-tetracarboxylic acid, isophthalic acid and terephthalic acid. Preferred hardeners are polyaminoamides.

The quantity of hardener used depends on the chemical nature of the hardener and on the desired properties of the hardenable mixture and of the hardened product. The maximum quantity can easily be determined. If the hardener is an amine, normally from 0.75 to 1.25 amine hydrogen equivalents are used per 1 epoxy equivalent. If polycarboxylic acids are used, usually from 0.4 to 1.1 carboxy group equivalents are used per 1 epoxy group equivalent. When polyphenols are used as hardeners, advantageously from 0.75 to 1.25 phenolic hydroxy groups are used per 1 epoxy equivalent.

If desired, active diluents, such as, for example, styrene oxide, butyl glycidyl ether, 2,2,4-trimethylpentyl glycidyl ether, phenyl glycidyl ether, cresyl glycidyl ether or glycidyl esters of synthetic, highly branched, predominantly tertiary, aliphatic monocarboxylic acids, can be added to the hardenable mixtures.

In addition, hardening accelerators may be used in the hardening process; such accelerators are, for example, tertiary amines, the salts thereof or quaternary ammonium compounds, for example benzyldimethylamine, 2,4,6-tris(dimethylaminomethyl)phenol, 1-methylimidazole, 2-ethyl-4-methylimidazole, 4-aminopyridine and tripentylammonium phenolate. Hardening of the mixtures according to the invention is advantageously carried out in a temperature range of from room temperature to 80° C., preferably from 20° to 50° C.

Hardening may be carried out in known manner also in two or more stages, the first hardening stage being carried out at low temperature and the post-hardening being carried out at higher temperature.

The expression "hardening" as used herein means the conversion of the soluble, either liquid or meltable polyepoxides into solid, insoluble and unmeltable, three-dimensionally crosslinked products or materials, especially for impregnations, coatings, surface-coating films or adhesive bonds.

The hardenable mixtures may further comprise suitable plasticisers, such as dibutyl phthalate, dioctyl phthalate or tricresyl phthalate.

Finally, there may be added to the hardenable mixtures before hardening, in any phase, extenders, fillers and reinforcing agents, such as, for example, mineral silicates, mica, quartz powder, aluminum oxide hydrate, bentonites, kaolin, silica aerogel or metal powders, for example aluminum power or iron powder, and also pigments and dyes, such as inter alia carbon black, oxide dyes, titanium dioxide. It is also possible to add to the hardenable mixtures other customary additives, for example flame retardants, thixotropic agents and flow control agents, such as silicones, waxes or stearates.

The hardenable mixtures can be prepared in the usual manner by adding the hardener to the dispersions according to the invention and using known mixing units.

The hardenable epoxy resin mixtures are used especially in the fields of surface-protection, electrical engineering, laminating processes and in construction engineering. They can be used in a formulation adapted to each specific application, with or without fillers, as paints, surface-coatings, dip-coating resins, impregnating resins and adhesives, as laminating resins, sealing or trowelling compounds, floor-covering compositions and binders for mineral aggregates.

The aqueous dispersions according to the invention are suitable especially for the manufacture of coatings, coating and painting materials and adhesives. In particular, they have excellent properties in use, such as low viscosity and long usable life. The hardened products are distinguished by great and rapidly obtainable hardness.

The invention relates also to crosslinked products obtainable by hardening the dispersions according to the invention with a hardener for epoxy resins.

The following Examples illustrate the invention.

EXAMPLES

General Process for the Preparation of the Block Copolymers

In a sulfonating flask equipped with stirrer, cooler and thermometer, 50 g of polyalkylene glycol are dissolved in approximately 150 ml of dried, freshly distilled dioxane with gentle heating under $N_2$. When the solution has cooled to 25° C., 7 g of a 30% sodium dispersion in toluene are added thereto and the mixture is stirred at room temperature for 2 hours. The mixture is then filtered under $N_2$ into a three-necked flask equipped with thermometer, cooler and magnetic stirrer. The required quantities of monoepoxide and anhydride are added, and the solution is stirred under $N_2$ at 80°–100° C. for 2–3 days. After the addition of a few drops of water, the solution is concentrated to from one half to two-thirds of the original volume in a rotary evaporator and precipitated with from 3 to 5 times the amount of diethyl ether. The resulting product is re-precipitated from approximately 100 ml of methylene chloride/500 ml of diethyl ether.

EXAMPLES 1–4

Synthesis of the Block Copolymers

EXAMPLE 1

50 g of polyethylene glycol 5000 monomethyl ether (0.01 mol) are dissolved in 150 ml of distilled dioxane under $N_2$. 7 g of a 30% sodium dispersion in toluene are added and the mixture is stirred at room temperature for 2 hours. The mixture is filtered into a 250 ml two-necked flask, and 12 g of phenyl glycidyl ether (0.08 mol) and 12 g of phthalic acid anhydride (0.08 mol) are added. The solution is stirred at 80° C. for 2 days. After the addition of a few drops of $H_2O$, the reaction mixture is filtered, and the filtrate is concentrated to approximately 100 ml in a rotary evaporator and precipitated with 500 ml of diethyl ether. The polymer so obtained is re-precipitated from methylene chloride/diethyl ether. Yield: 52 g (70.2%), $Mn=6400$, $Mw=12\ 000$ (mean mol. wt., weight mean).

EXAMPLE 2

The experiment described in Example 1 is repeated. 7.85 g of cyclohexene oxide (0.08 mol) are used instead of 12 g of phenyl glycidyl ether. Yield: 50 g (71.5%), $Mn=7900$, $Mw=12\ 800$.

EXAMPLE 3

The experiment described in Example 1 is repeated. 10.41 g of butyl glycidyl ether (0.08 mol) are used instead of 12 g of phenyl glycidyl ether. Yield: 54.3 g (75%), $Mn=5000$, $Mw=11\ 000$.

EXAMPLE 4

The experiment described in Example 1 is repeated. 8.01 g of butyloxirane (1-hexene oxide; 0.08 mol) are used instead of 12 g of phenyl glycidyl ether. Yield: 51.8 g (74%), $Mn=5700$, $Mw=11\ 000$.

EXAMPLES 5–10

Preparation of the Aqueous Epoxy Resin Dispersions

EXAMPLE 5

80 g of solid epoxy resin based on bisphenol A with an epoxy content of 2.2 equivalents/kg are melted in an oven at approximately 100° C., and 4.8 g of polymer from Example 1 and 9 ml of 2-ethoxyethanol are added at room temperature and the components are mixed with a dispersing apparatus (Rotor-Stator-Ultra-Turrax T-25) at low speed. 72 ml of water are then added in portions of approximately 10 ml. Up to a quantity of approximately 20 ml of water, the mixture is stirred at the highest speed (24 000 rev/min). As the mixture becomes increasingly liquid, the speed is reduced to approximately 8000 rev/min. There is produced a stable homogeneous dispersion having a viscosity of 205 cPs at 25° C. (Brookfield, spindle No. 4) and an epoxy content of 1.05 epoxy equiv./kg.

EXAMPLE 6

The experiment described in Example 5 is repeated with 6 g of polymer from Example 1. There is produced a stable homogeneous dispersion having a viscosity of 4800 cPs at 25° C. (Brookfield, spindle No. 4) and an epoxy content of 1.01 epoxy equiv./kg.

EXAMPLE 7

The experiment described in Example 5 is repeated with 4.8 g of polymer from Example 3. There is produced a stable aqueous dispersion having a viscosity of approximately 200 cPs at 25° C. (Brookfield, spindle No. 4) and an epoxy content of 1.03 epoxy equiv./kg.

EXAMPLE 8

The experiment described in Example 5 is repeated using a dissolver having a toothed disc at approximately 3000 rev/min. There is produced a stable aqueous dispersion having a viscosity of approximately 6000 cPs at 25° C. (Brookfield, spindle No. 4) and an epoxy content of 1.15 epoxy equiv./kg.

EXAMPLE 9

The experiment described in Example 5 is repeated with 4.8 g of polymer from Example 4. There is produced a stable aqueous dispersion having a viscosity of 110 cPs and an epoxy content of 1.06 epoxy equiv./kg.

EXAMPLE 10

80 g of a liquid epoxy resin based on bisphenol A having an epoxy content of 5.5 equivalents/kg are mixed with 4.8 g of polymer from Example 3 and 9 ml of 2-ethoxyethanol using a dispersing apparatus (Rotor-Stator-Ultra-Turrax T-25) at low speed. 72 ml of water are then added in portions of approximately 10 ml. Up to a quantity of approximately 20 ml of water, the mixture is stirred at the highest speed (24 000 rev/min). As the mixture becomes increasingly liquid, the speed is reduced to approximately 8000 rev/min. There is produced a stable homogeneous emulsion having a viscosity of 200 cPs at 25° C. (Brookfield, spindle No. 4) and an epoxy content of 2.68 epoxy equiv./kg.

APPLICATION EXAMPLES 11–14

The dust dryness and full hardening indicated in the Examples are determined with an apparatus manufactured by Landolt.

EXAMPLE 11

30 g of the dispersion from Example 6 are mixed with 6.48 g of a 50% by weight aqueous solution of a polyaminoamide having an amine number of 165 mg of KOH/g (Ciba-Geigy HZ 340). Using this mixture, films are produced on aluminium sheets in such a manner that a dry film thickness of approximately 50 µm is obtained. The following surface-coating properties are obtained:

| | |
|---|---|
| usable life of the resin/hardener mixture (first appearance of haze in the film after mixing resin and hardener): | 4 h; |
| dust dryness of the film (sand scattered on the film can no longer be removed with a paint brush after full cure): | 6 h; |
| full hardening: | 13.5 h |
| König hardness (DIN 53 157) (1 day): | 68 s |
| König hardness (7 days): | 132 s |
| König hardness (4 weeks): | 170 s. |

EXAMPLE 12

30 g of the dispersion from Example 7 are mixed with 6.66 g of the above-mentioned hardener. The usable life of this mixture is 4 h. Films on aluminium sheets (~50 µm dry film thickness) have the following properties:

| | |
|---|---|
| dust dryness: | 6.5 h |
| full hardening: | 15 h |
| König hardness (1 day): | 100 s |
| König hardness (7 days): | 150 s |
| König hardness (4 weeks): | 169 s. |

EXAMPLE 13

30 g of the dispersion from Example 9 are mixed with 6.81 g of the above-mentioned hardener. The usable life of this mixture is 4 h. Films on aluminium sheets (~50 µm dry film thickness) have the following properties:

| | |
|---|---|
| dust dryness: | 4 h |
| full hardening: | 14.5 h |
| König hardness (1 day): | 95 s |
| König hardness (7 days): | 144 s |
| König hardness (4 weeks): | 165 s. |

EXAMPLE 14

30 g of the dispersion from Example 8 are mixed with 7.44 g of the above-mentioned hardener. The usable life of this mixture is 3 h. Films on aluminium sheets (~50 µm dry film thickness) have the following properties:

| | |
|---|---|
| dust dryness: | 7 h |
| full hardening: | 10 h |
| König hardness (1 day): | 115 s |
| König hardness (7 days): | 158 s |
| König hardness (4 weeks): | 175 s. |

EXAMPLE 15

(Preparation of Tri-Block Copolymers)

50 g of polyethylene glycol 6000 (0.017 hydroxy group equivalent) are dissolved in 300 ml of distilled dioxane under nitrogen. 7 g of a 30% sodium dispersion in toluene are added and the mixture is stirred at room temperature for 2 hours. The resulting mixture is filtered into a 500 ml two-necked flask, and 8.48 g of phenyl glycidyl ether (0.057 mol) and 8.48 g of phthalic acid anhydride (0.057 mol) are added. The resulting mixture is stirred at 80° C. for 2 days. After the addition of a few drops of water, the reaction mixture is filtered, and the filtrate is concentrated to approximately 100 ml and precipitated with 500 ml of diethyl ether. The polymer so obtained is re-precipitated from methylene chloride/diethyl ether. Yield: 55 g (82%) of a product of $Mn=5700$ and $Mw=10\,100$.

EXAMPLE 16

Example 15 is repeated, but with the difference that 50 g of polyethylene glycol 10 000 (0.01 hydroxy group equivalent) are used instead of polyethylene glycol 6000. 5.03 g of phenyl glycidyl ether (0.034 mol) and 5.03 g of phthalic acid anhydride (0.034 mol) are added to the filtered solution of the sodium salt of the polyethylene glycol. Yield: 52.3 g (87%) of a product of $Mn=7800$ and $Mw=20\,200$.

EXAMPLE 17

(Preparation of Dispersions)

80 g of a solid epoxy resin based on bisphenol A having an epoxy content of 2.2 equivalents/kg are melted in an oven at approximately 100° C., and 4.8 g of polymer from Example 15 and 9 ml of 2-ethoxyethanol are added at room temperature. The resulting mixture is homogenised using a dispersing apparatus (Rotor-Stator-Ultra-Turrax T-25) at low speed. 72 ml of water are then added in portions of 10 ml. Up to a quantity of approximately 20 ml of water, the mixture is stirred at the highest speed. As the mixture becomes increasingly liquid, the speed is reduced to approximately 8000 rev/min. There is produced a very liquid dispersion which, however, shows a tendency towards phase separation after only a few hours.

EXAMPLE 18

Example 17 is repeated, but with the difference that 4.8 g of polymer from Example 16 are used. There is produced a homogeneous dispersion which similarly shows a tendency towards phase separation after a few hours.

What is claimed is:

1. A polyether-polyester block copolymer of the formula I

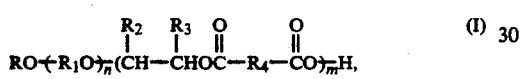

wherein R is $C_1$–$C_4$alkyl or a radical of formula II

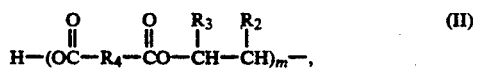

$R_1$ is $C_2$–$C_{10}$alkylene, $R_2$ is hydrogen and $R_3$ is $C_1$–$C_{12}$alkyl, $C_5$–$C_{10}$cycloalkyl, $C_6$–$C_{10}$aryl or a radical —$CH_2OR_5$ in which $R_5$ is $C_4$–$C_{10}$alkyl, $C_5$–$C_6$cycloalkyl or $C_6$–$C_{10}$aryl, or $R_2$ and $R_3$ together with the carbon atoms to which they are bonded are a cyclopentylene or cyclohexylene radical, $R_4$ is phenylene or naphthylene and n is an integer from 2 to 5000 and m is an integer from 2 to 1000 obtained by anionic copolymerization of a monoepoxy compound with a cyclic anhydride of an aromatic dicarboxylic acid, using an alkali metal salt of a polyalkylene glycol or of a polyalkylene glycol monoalkyl ether as initiator.

2. A block copolymer according to claim 1, wherein the polyalkylene glycol has from 2 to 5000 alkylene glycol units.

3. A block copolymer according to claim 1, wherein the alkylene group of the polyalkylene glycol is 1,4-butylene, 1,2- or 1,3-propylene or ethylene.

4. A block copolymer according to claim 1, wherein the monoepoxy compound is a glycidyl ether, an alkene oxide or a cycloalkene oxide.

5. A block copolymer according to claim 1, wherein the cyclic anhydride is 1,8-naphthalenedicarboxylic acid anhydride or phthalic acid anhydride.

6. A block copolymer according to claim 1 comprising one polyether block and one or two polyester block(s).

7. A block copolymer according to claim 6, wherein the polyester block has from 2 to 1000 recurring units.

8. A block copolymer according to claim 1 having a mean molecular weight (numerical mean) of from 1000 to 50 000.

9. An aqueous dispersion or emulsion comprising (a) a block copolymer according to claim 1 and (b) an epoxy resin.

10. A crosslinked product obtained by hardening the dispersion according to claim 9 with a hardener for epoxy resins.

11. A dispersion according to claim 9 comprising from 2 to 20% by weight block copolymer (a), from 30 to 78% by weight epoxy resin (b), from 20 to 70% by weight water and, from 0 to 25% by weight of an organic solvent, said weight percentages based on the total dispersion.

* * * * *